(12) United States Patent
Sebestyen

(10) Patent No.: US 11,014,459 B2
(45) Date of Patent: May 25, 2021

(54) CHARGING DEVICE FOR A VEHICLE

(71) Applicant: VOLVO TRUCK CORPORATION, Gothenburg (SE)

(72) Inventor: Richard Sebestyen, Torslanda (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 0 days.

(21) Appl. No.: 15/763,896

(22) PCT Filed: Sep. 30, 2015

(86) PCT No.: PCT/EP2015/072584
§ 371 (c)(1),
(2) Date: Mar. 28, 2018

(87) PCT Pub. No.: WO2017/054858
PCT Pub. Date: Apr. 6, 2017

(65) Prior Publication Data
US 2018/0281611 A1 Oct. 4, 2018

(51) Int. Cl.
*B60L 5/38* (2006.01)
*B60L 53/14* (2019.01)
(Continued)

(52) U.S. Cl.
CPC ............... *B60L 53/14* (2019.02); *B60L 5/38* (2013.01); *B60L 5/42* (2013.01); *B60L 11/1833* (2013.01);
(Continued)

(58) Field of Classification Search
CPC .. B60L 53/14; B60L 53/16; B60L 5/38; B60L 5/40; B60L 5/42
See application file for complete search history.

(56) References Cited

U.S. PATENT DOCUMENTS 3,729,599 A * 4/1973 Payen ...................... B60L 5/38
191/49
5,464,082 A 11/1995 Young
(Continued)

FOREIGN PATENT DOCUMENTS

CN 103038975 A 4/2013
CN 204039861 U 12/2014
(Continued)

OTHER PUBLICATIONS

International Search Report (Jul. 21, 2016) for corresponding International App. PCT/EP2015/072584.
(Continued)

*Primary Examiner* — David V Henze-Gongola
(74) *Attorney, Agent, or Firm* — . Venable LLP; Jeffri A. Kaminski

(57) ABSTRACT

A charging device for a vehicle including an electric storage arrangement. The charging device is arranged to be mounted to a portion of the vehicle, the charging device including a movable contacting element for electric contact with a stationary contacting element for electric charging of the electric storage arrangement. The charging device further includes an actuator for moving the movable contacting element between a retracted position and a protruded position, the charging device being arranged so that, while the vehicle is in a charging position in relation to the stationary contacting element, the stationary contacting element can be reached by the charging device, while the movable contacting element is in the protruded position, for the electric contact between the movable contacting element and the stationary contacting element, wherein a protective element arranged to restrict access to the movable contacting element and the stationary contacting element when the movable
(Continued)

contacting element and the stationary contacting element are in the electric contact with each other.

20 Claims, 5 Drawing Sheets

(51) Int. Cl.
    *B60L 5/42*         (2006.01)
    *B60L 53/36*       (2019.01)
    *B60L 53/30*       (2019.01)
    *B60L 11/18*       (2006.01)

(52) U.S. Cl.
    CPC ............... *B60L 53/30* (2019.02); *B60L 53/32* (2019.02); *B60L 53/36* (2019.02); *B60L 2200/36* (2013.01); *Y02T 10/70* (2013.01); *Y02T 10/7072* (2013.01); *Y02T 90/12* (2013.01); *Y02T 90/14* (2013.01)

(56) References Cited

U.S. PATENT DOCUMENTS

| | | | |
|---|---|---|---|
| 8,890,475 B1* | 11/2014 | Becker | B60L 11/1827 320/109 |
| 2009/0011616 A1* | 1/2009 | Patwardhan | H01R 13/629 439/34 |
| 2009/0255727 A1* | 10/2009 | Tarchinski | H02G 15/105 174/84 R |
| 2010/0296230 A1* | 11/2010 | Storck | H02G 3/0493 361/641 |
| 2011/0256737 A1 | 10/2011 | Lacour | |
| 2011/0285349 A1 | 11/2011 | Widmer et al. | |
| 2015/0021134 A1 | 1/2015 | Santner | |
| 2015/0145472 A1 | 5/2015 | Kees et al. | |

FOREIGN PATENT DOCUMENTS

| | | |
|---|---|---|
| DE | 102010020122 A1 | 11/2011 |
| JP | S62230303 A | 10/1987 |
| JP | 2010226946 A | 10/2010 |
| JP | 2012-235650 A | 11/2012 |
| WO | 2009070334 A1 | 6/2009 |
| WO | 2014202103 A1 | 12/2014 |
| WO | 2015068221 A1 | 5/2015 |
| WO | 2015115122 A1 | 8/2015 |

OTHER PUBLICATIONS

English translation of Japanese Office Action dated Sep. 10, 2019, issued in corresponding JP Application No. 2018-516567.
Office Action dated Apr. 3, 2020 in corresponding EP Application No. 15771152.4, 6 pages.
China Office Action dated Sep. 22, 2020 in corresponding China Patent Application No. 201580083493.2, 22 pages.

* cited by examiner

CHARGING DEVICE FOR A VEHICLE

BACKGROUND AND SUMMARY

The invention relates to a charging device for a vehicle comprising an electric storage arrangement, the charging device being arranged to be mounted to a portion of the vehicle, the charging device comprising a movable contacting element for electric contact with a stationary contacting element for electric charging of the electric storage arrangement, the charging device further comprising an actuator for moving the movable contacting element between a retracted position and a protruded position, the charging device being arranged so that, while the vehicle is in a charging position in relation to the stationary contacting element, the stationary contacting element can be reached by the charging device, while the movable contacting element is in the Protruded position, for the electric contact between the movable contacting element and the stationary contacting element.

The invention also relates to a vehicle comprising a charging device, and a method for charging an electric storage arrangement of a vehicle.

The invention can be applied in heavy-duty vehicles, such as trucks, buses and construction equipment, e.g. working machines. The invention can also be applied to cars. Although the invention will be described with respect to a truck, the invention is not restricted to this particular vehicle type.

Various solutions for charging devices for vehicles, e.g. electric vehicles or electric hybrid vehicles, which automatically provide an electric connection once the vehicle is in a suitable position, have been suggested, e.g. as described in US2011256737A1. Such charging typically involves high currents, and it is desirable to reduce risks to persons or animals in the vicinity of the vehicle.

It is desirable to reduce risks to persons or animals in the vicinity of a vehicle with an electric storage arrangement being charged with a charging device comprising an actuator for moving a movable contacting element between a retracted position and a protruded position for electric contact between the movable contacting element and a stationary contacting element.

According to an aspect of the invention, a charging device for a vehicle comprising an electric storage arrangement is provided, the charging device being arranged to be mounted to a portion of the vehicle, the charging device comprising a movable contacting element for electric contact with a stationary contacting element for electric charging of the electric storage arrangement, the charging device further comprising an actuator for moving the movable contacting element between a retracted position and a protruded position, the charging device being arranged so that, while the vehicle is in a charging position in relation to the stationary contacting element, the stationary contacting element can be reached by the charging device, while the movable contacting element is in the protruded position, for the electric contact between the movable contacting element and the stationary contacting element, wherein a protective element arranged to restrict access to the movable contacting element and the stationary contacting element when the movable contacting element and the stationary contacting element are in the electric contact with each other.

It is understood that the movable contacting element is arranged to be electrically connected to an electric conduit for an electric connection with the electric storage arrangement. It is also understood that the stationary contacting element may be part of a stationary charging station. It is further understood that the actuator is arranged to move, while the vehicle is in the charging position in relation to the stationary contacting element, the movable contacting element to the protruded position and into contact with the stationary contacting element.

The protective element restricting access to the movable contacting element and the stationary contacting element makes it possible to avoid persons or animals coming into contact with the contacting elements. The invention may also simplify and reduce the cost of vehicle charging systems, since it allows dispensing with technologies, e.g. involving sensors, to continuously monitor whether a person or animal, such as a child, a dog, or a cat, comes into a vicinity of the contacting elements to allow touching them.

Preferably, the protective element is arranged to extend in all horizontal directions outwardly from the movable contacting element, when the movable contacting element and the stationary contacting element are in the electric contact with each other. Thereby access to the contacting elements is reduced from any direction around the contacting elements. This further reduces risks to persons or animals in the vicinity of a vehicle with the charging device in operation.

Preferably, the protective element is arranged to extend at least 100 mm in all horizontal directions outwardly from the movable contacting element, when the movable contacting element and the stationary contacting element are in the electric contact with each other. Preferably, the protective element is arranged to be, when the movable contacting element and the stationary contacting element are in the electric contact with each other, at a distance of less than 50 mm from a stationary surrounding element, such as a vehicle supporting element. The stationary surrounding element may be for example a road, a street, a building floor, a loading area, a quayside, or a bridge, surrounding the stationary contacting element. Thus, a relatively large horizontal extension of the protective element beyond the contacting elements may be provided, and a relatively small vertical distance between the protective element and the vehicle supporting element may be provided. Thus further augments the safety function of the protective element, in that it may make it impossible for persons, e.g. children, or animals, e.g. pets, to reach the contacting elements.

Preferably, the protective element is fixed in relation to the movable contacting element. Thereby, the protective element may be positioned according to its function as the movable contacting element is moved into contact with the stationary contacting element.

Preferably, the protective element is made in a non-conductive material, or the protective element comprises a supporting portion and a cover, the cover being in a non-conductive material and arranged to cover the supporting portion. Thereby, protection is provided, e.g. to persons or animals, to electric current in the movable contacting element. The protective element, e.g. the cover of it where this is provided, may present a skirt arranged to surround the stationary contacting element when the movable contacting element is in contact with the stationary contact ng element. The skirt may be in an elastic material, so as to deform by contact with a stationary element surrounding the stationary contacting element, when the movable contacting element and the stationary contacting element are in contact with each other.

The charging device may comprise a charging arm arranged to be pivotally connected at one end to said portion of the vehicle, wherein the movable contacting element is mounted to the other end of the charging arm. Where the protective element is fixed in relation to the movable contacting element, this allows for an accurate positioning of the protective element according to its protective function. The charging arm may comprise a cover in a non-conductive material, providing protection, e.g. to persons or animals, to electric current in the charging arm.

The charging device may be arranged so as to provide the electric contact of the movable contacting element with the stationary contacting element where the stationary contacting element is located on or in a vehicle supporting element. The inventive provision of the protective element is particularly advantageous where the stationary contacting element is located on or in a vehicle supporting element, e.g. a road or a street, where it may be easily accessed by a person or an animal. The charging device may be arranged to be mounted on a downwards facing portion of the vehicle. The protective element will thereby provide protection where the charging elements are located under a parked vehicle, where animals, such as cats, and even children may tend to enter.

Preferably, the protective element is arranged so that when the movable contacting element is in the electric contact with the stationary contacting element, the protective element is in contact with a stationary surrounding element surrounding the stationary contacting element. Thereby, it is possible to eliminate the risk of a person or an animal coming into contact with the contacting elements.

Preferably, a region of contact between the protective element and the stationary surrounding element surrounds the movable contacting element. The stationary surrounding element may be higher, at level with, or lower than the stationary contacting element. The protective element may e.g. comprise a protective skirt arranged so that when the movable contacting element is in the electric contact with the stationary contacting element, the skirt surrounds the movable contacting element, and is in contact with the stationary surrounding element. Thereby, the risk of a person or an animal coming into contact with the contacting elements is eliminated, i.e., the contacting elements may be "touch-proof".

Preferably, the charging device is arranged so that while the movable contacting element is in the protruded position, the movable contacting element extends to a lower position than the protective element. This allows for using the charging device for charging the electric storage arrangement while the vehicle is stationary as well as when the vehicle is moving. This allows for a flexible charging process, involving either a stationary vehicle or a moving vehicle. The moving vehicle can be charged by an electrical road system, comprising an elongated stationary contacting element in the road.

Preferably, the charging device further comprises an aerodynamic device arranged to provide, while the vehicle moves along the elongated stationary contacting element, a downwards directed force to the contacting element of the charging device. The aerodynamic device will reduce, while charging when the vehicle is moving, by means of the downwards directed force, the risk of the movable contacting element losing the electric contact with the elongated stationary contacting element when the vehicle moves along the stationary contacting element.

Preferably the aerodynamic device is integrated with the protective element. Thereby, the combined protective element and aerodynamic device may provide the dual function or reducing access to the contacting element for charging while the vehicle is stationary, and reducing, while charging when the vehicle is moving, the risk of the movable contacting element losing the electric contact with the elongated stationary contacting element. Preferably, the combined protective element and aerodynamic device is relatively small to keep low weight and to manage vibrations during charging when the vehicle is moving.

According to an aspect of the invention, a combination is provided of a charging station and a charging device for a vehicle comprising an electric storage arrangement, the charging station comprising a stationary contacting element which is provided in a stationary surrounding element comprising a vehicle supporting element, the charging device being arranged to be mounted to a portion of the vehicle, the charging device comprising a movable contacting element for electric contact with a contacting surface of the stationary contacting element for electric charging of the electric storage arrangement, characterized in that the charging device comprises a protective element arranged to restrict access to the movable contacting element and the stationary contacting element when the movable contacting element and the stationary contacting element are in the electric contact with each other, and that the charging device is arranged so that the movable contacting element extends to a lower position than the protective element when the movable contacting element and the stationary contacting element are in the electric contact with each other, and that the contacting surface of the stationary contacting element is lower than a surface of the stationary surrounding element in a vicinity of the stationary contacting element.

The charging device may comprise an actuator for moving the movable contacting element between a retracted position and a protruded position. This aspect of the invention provides for the protective element being arranged so that when the movable contacting element is in the electric contact with the stationary contacting element, the protective element is in contact with the stationary surrounding element. This substantially reduces the risk of persons, e.g. children, or animals, e.g. pets, reaching the contacting element. At the same time, the charging device may be arranged so that while the movable contacting element is in the protruded position, the movable contacting element extends to a lower position than the protective element. This allows for using the charging device for charging the electric storage arrangement while the vehicle is stationary, as well as when the vehicle is moving, e.g. with the aid of an elongated stationary contacting element. This allows for a flexible charging process, involving either safe charging of a stationary vehicle or charging a moving vehicle by use of the same charging device.

The contacting surface of the stationary contacting element being lower than the surface of the stationary surrounding element in a vicinity of the stationary contacting element, may mean that said contacting surface is lower than the surface of the stationary surrounding element in a an area covered by the protective element when the movable contacting element is in contact with the stationary contacting element. Thereby the protective element may be arranged so that when the movable contacting element is in the electric contact with the stationary contacting element, the protective element is in contact with the vehicle supporting element, or a stationary frame surrounding the stationary contacting element.

An aspect of the invention provides a charging station comprising a stationary contacting element for electric contact with a movable contacting element of a charging device of a vehicle for electric charging of an electric storage arrangement of the vehicle, the stationary contacting element being provided in a vehicle supporting element, the charging station further comprising an electric ground shield surrounding the movable contacting element. The electric ground shield may provide for avoiding leakage currents on the vehicle supporting element due to for example moist, water or salt. For example, if the vehicle supporting element is covered with water, the ground shield will reduce the risk of electric currents outside the ground shield.

A further aspect of the invention provides a charging device for a vehicle comprising an electric storage arrangement, the charging device being arranged to be mounted to a portion of the vehicle, the charging device comprising a contacting element for electric contact with an elongated stationary contacting element for electric charging of the electric storage arrangement while the vehicle is moving along the stationary contacting element, the charging device further comprising an aerodynamic device arranged to provide, while the vehicle moves along the stationary contacting element, a downwards directed force to the contacting element of the charging device.

Thereby, the aerodynamic device will reduce, by means of the downwards directed force, the risk of the contacting element of the charging device losing the electric contact with the stationary contacting element where the vehicle moves along the stationary contacting element.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION

Figure 1:
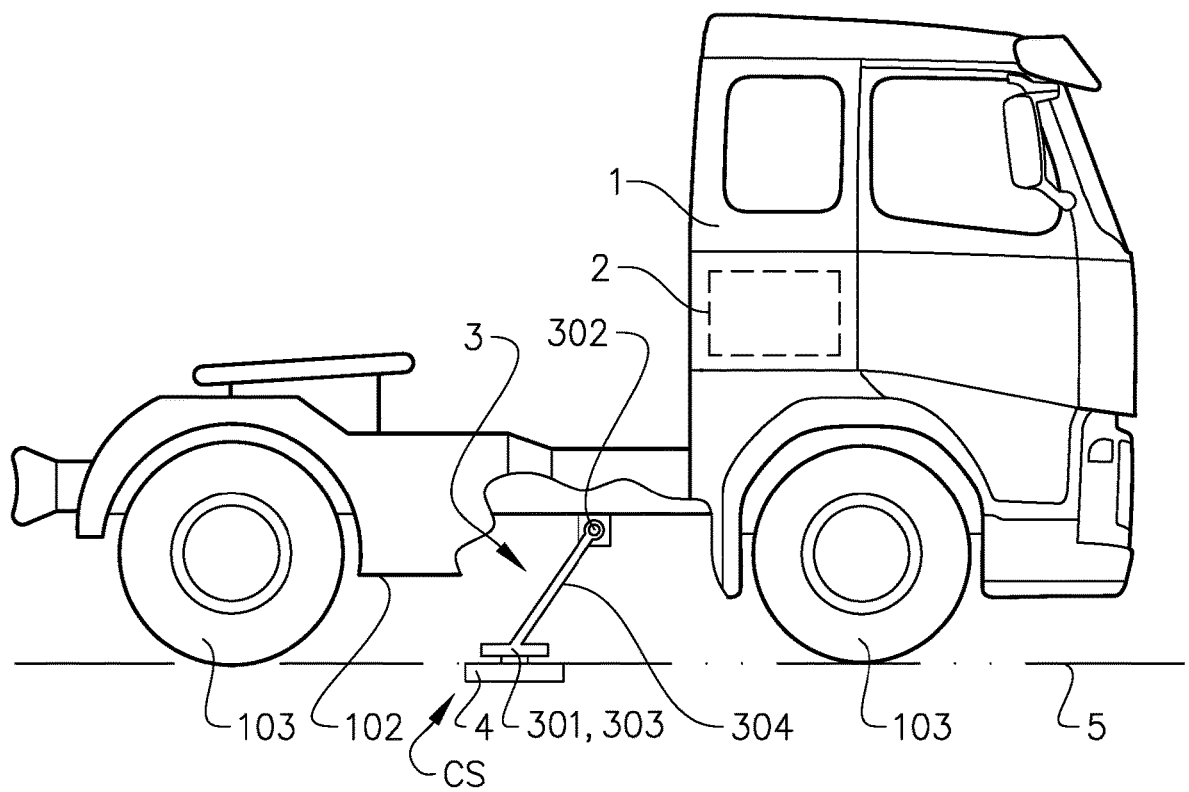
FIG. 1 is a partly sectioned side view of a vehicle with a charging device according to an embodiment of the invention.

FIG. 1 shows a vehicle 1 in the form of a truck, or a tractor for a semitrailer. It should be noted that the vehicle can be of a variety of alternative types, e.g. it may be a car, a bus, or a working machine such as a wheel loader.

The vehicle 1, presents a chassis 102, a cab, a drivetrain, and a plurality of wheels 103. In this example, the vehicle 1 can be an electric hybrid vehicle, and has in addition to the engine, an electric motor, (not shown), or it can be a fully electric vehicle. The vehicle 1 also comprises an electric storage arrangement 2, in the form of a battery pack.

For charging the electric storage arrangement 2, the vehicle 1 comprises a charging device 3, mounted to a downwards facing portion of the vehicle 1, in this example the chassis 102. The charging device 3 comprises a movable contacting element 301 for electric contact with a stationary contacting, element 4 for electric charging of the electric storage arrangement 2. The stationary contacting element 4 is located on or in a vehicle supporting element 5, e.g. a mad, a street, a building floor, a loading area, a quayside, or a bridge, herein also referred to as a stationary surrounding element 5. The stationary contacting element 4 is part of a charging station CS.

The stationary contacting element 4 may be arranged to supply the current in any suitable form, e.g. 1-phase AC. Further, there may be a pair of stationary contacting elements 4 and a corresponding pair of movable contacting elements 301, adapted e.g. for a +/− DC link.

The charging device 3 comprises a charging arm 304 arranged to be pivotably connected at one end to the chassis 102. The movable contacting element 301 is mounted to the other end of the charging arm 304. The charging device 3 further comprising an actuator 302 for moving the movable contacting element 301 between a retracted position and a protruded position, by pivoting the charging arm 304 around its connection to the chassis 102.

Thereby charging device 3 is arranged so that, while the vehicle 1 is parked in a charging position in relation to the stationary contacting element 4, the stationary contacting element 4 can be reached by the charging device 3, while the movable contacting element 301 is in the protruded position. Thereby the electric contact between the movable contacting element 301 and the stationary contacting element 4 is made possible.

Figure 2A:
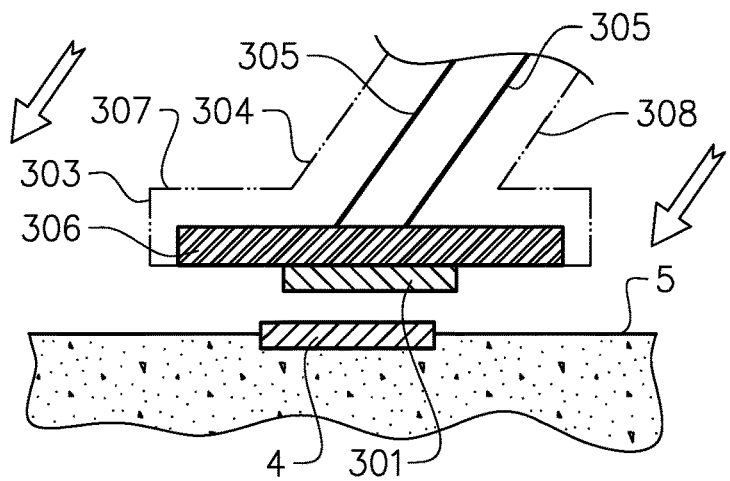
FIG. 2a and FIG. 2b are cross-sectional views of a part of the charging device of the vehicle in FIG. 1, and a stationary contacting element.
Figure 2B:
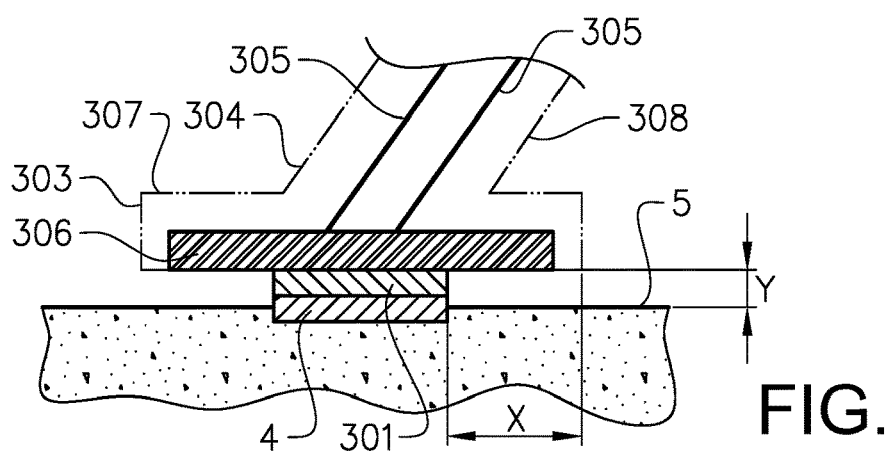

Reference is made to FIG. 2a, showing the movable contacting element 301 being moved towards the stationary contacting element. 4, and FIG. 2b, showing the movable contacting element 301 in contact with the stationary contacting element 4. The charging device comprises a protective element 303 arranged to restrict access to the movable contacting element 301 and the stationary contacting element 4. The protective element 303 is fixed in relation to the movable contacting element 301, and is in the protruded positon of the charging device 3 located above the movable contacting element 301. Further, the protective element 303 is arranged to extend, a indicated in FIG. 2b with the double arrow X, at least 100 mm in all horizontal directions outwardly from the movable contacting element 301, when the movable contacting element 301 and the stationary contacting element 4 are in the electric contact with each other. Further, the protective element 303 is arranged to be at a distance, as indicated in FIG. 2b with the arrows Y, of less than 50 mm from a portion if the vehicle supporting element 5, surrounding the stationary contacting element 4.

Said relatively large horizontal extension X, and relatively small vertical distance Y, provides a safety function in that it makes it difficult for persons, e.g. children, or animals, e.g. pets, to reach the contacting elements 301, 4.

The charging arm 304 houses conduits 305 for the electrical connection between the movable contacting element 301 and the electric storage arrangement 2. The protective element 303 comprises a supporting portion 306 and an electrically isolated, non-conductive cover 307. The cover 307 encloses the supporting portion 306, which serves to support the conduits 305. Another cover 308 forms a part of the arm 304, thereby enclosing the conduits 305. In some embodiments, the supporting portion 306 may be made in a non-conductive material, whereby the need for a non-conductive cover is avoided.

In alternative embodiments, the protective element 303 is arranged so that when the movable contacting element 301 is in the electric contact with the stationary contacting element 4, the protective element 303 is in contact with the stationary surrounding element 5, e.g. in the form of the vehicle supporting element 5. This may be accomplished by providing the protective element with a skirt surrounding the movable contacting element 301. Such a skirt could be elastic so as to deform by contact with the stationary surrounding element 5, when the movable contacting element 301 is in the electric contact with the stationary contacting element 4. Such a skirt may be provided by the cover 307, where this is provided.

Figure 3:
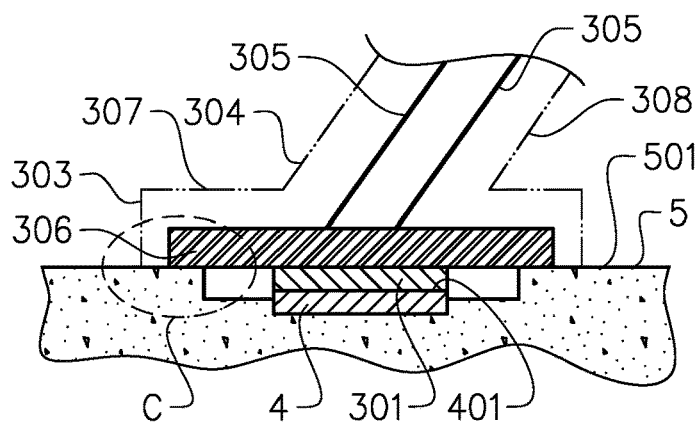
FIG. 3 is a view corresponding to the one in FIG. 2b, with a differently arranged stationary contacting element.

FIG. 3 shows an alternative embodiment for providing a contact between the protective element 303 and the vehicle supporting element 5. A contacting surface 401 of the stationary contacting element 4 is lower than a surface 501 the surrounding vehicle supporting element 5. This provides for the protective element 303 being in contact, as indicated by the broken circle C, with the vehicle supporting element 5. A region of such contact C between the protective element 303 and the vehicle supporting element 5 surrounds the movable contacting element 301. This further reduces the risk of persons, e.g. children, or animals, e.g. pets, reaching the contacting elements 301, 4.

Figure 4:
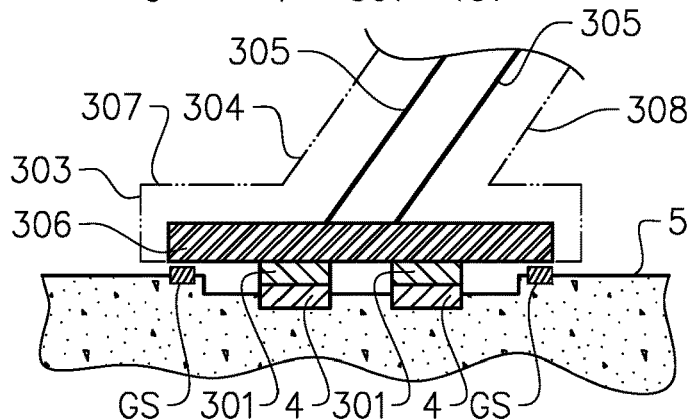
FIG. 4 is a view corresponding to the one in FIG. 2b, with a ground shield arranged at two stationary contacting elements.

FIG. 4 shows an alternative embodiment, in which the charging device is provided with two movable contacting elements 301, arranged to be in contact with a respective of two stationary contacting elements 4. Further, the charging station CS is provided with an electric ground shield GS surrounding the stationary contacting elements 4. The electric ground shield GS may be in any suitable electrically conducting material, such as copper or stainless steel. The ground shield GS is in this embodiment arranged as a bar extending at a distance from, and surrounding the stationary contacting elements 4. The ground shield GS is further arranged to extend above the surrounding element, in this case the vehicle supporting element 5. Also, the ground shield GS is partly submerged in the vehicle supporting element 5.

In FIG. 4, the ground shield GS is not in contact with the protective element 303. In alternative embodiments, the ground shield GS may be arranged to contact the protective element 303 when the movable contacting element is in contact with the stationary contacting element 4.

The electric ground shield GS may in alternative embodiments be provided by the protective element 303, and arranged to be in contact with the vehicle supporting element 5 when the movable contacting element(s) 301 and the stationary contacting element(s) is/are in contact with each other. In some embodiments, an electric shield can be provided by the protective element as well as in the vehicle supporting element 5. The electric ground shield may provide for avoiding leakage currents on the vehicle supporting element 5 due to for example moist, water or salt. For example, if the vehicle supporting element 5 is covered with water, the ground shield GS will reduce the risk of electric currents outside the ground shield GS.

Figure 5:
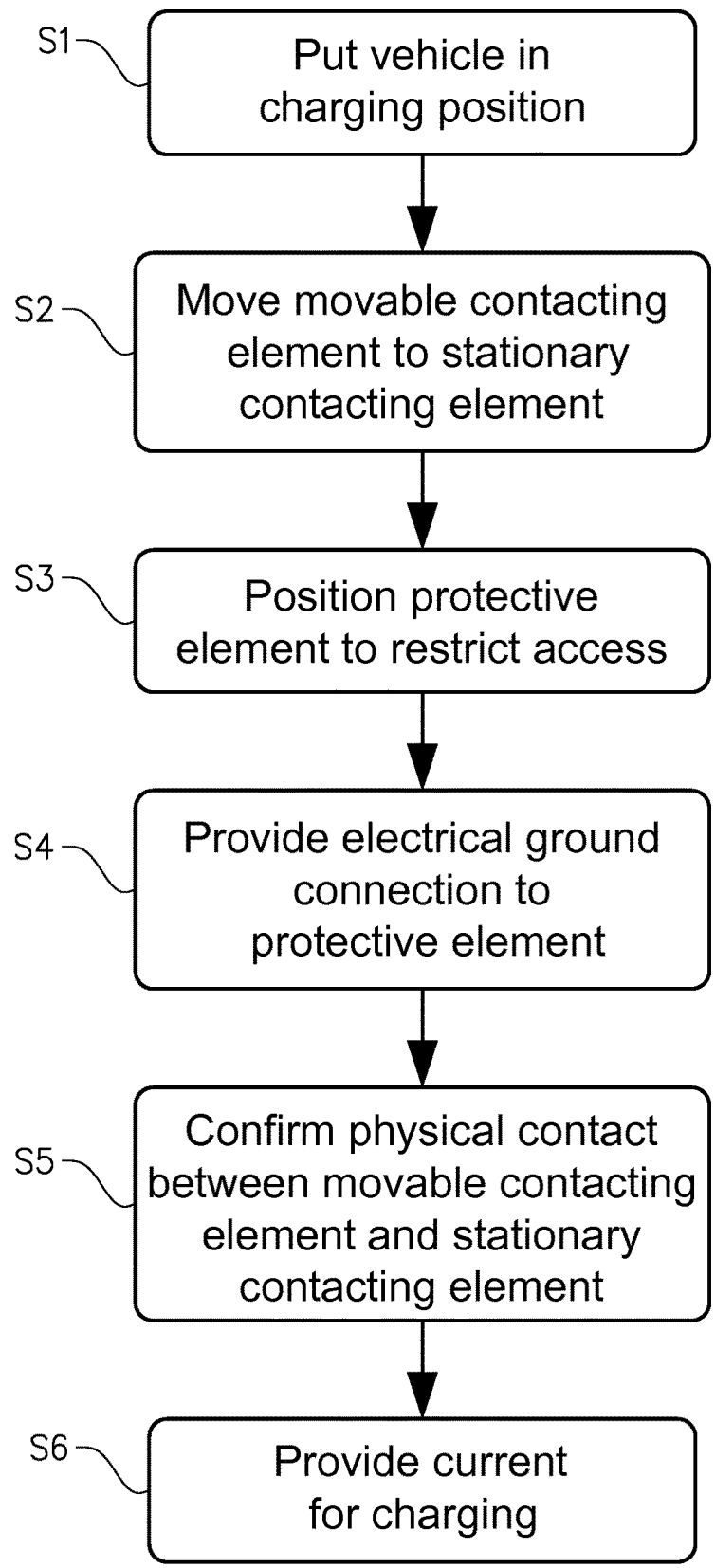
FIG. 5 is a flow diagram depicting, steps in a method according to an embodiment of the invention.

Reference is made to FIG. 5, depicting steps in a method for charging the electric storage arrangement 2 of the vehicle 1. The vehicle is put or parked S1 in a charging position in relation to the stationary contacting element 4. As stated, the stationary contacting element 4 is part of the charging station CS. The location of the stationary contacting element 4 may be at any suitable location for the truck 1, e.g. in a loading area. Where the vehicle is a bus, the stationary contacting element 4 may be located at a bus-station, or even a bus stop. Suitable there will be indications or instructions for the driver to correctly position the vehicle at the stationary contacting element 4, in order for it to be reached by the charging device as described below.

The actuator 302 is controlled for the movable contacting element 301 to be moved S2 from its retracted position to the protruded position, towards the stationary contacting element 4, and for providing a physical contact between the movable contacting element 301 and the stationary contacting element 4. For this, the charging device 3 may be arranged to move the movable contacting element 301 in a plurality of degrees of freedom. Also, the charging device may be provided with one or more sensors, such as a camera, to establish the position of the stationary contacting element 4, and/or the position of the movable contacting element 301 in relation to the stationary contacting element 4.

In addition, by being fixed to the movable contacting element 303, the protective element 303 is provided 53, here positioned, to restrict access to the movable contacting element 301 and the stationary contacting element 4 when said element 301, 4 are in the electric contact with each other. Thereby, the protective element 303 is arranged to extend in all horizontal directions outwardly from the movable contacting element 301. Further, an electrical ground connection is provided S4 to the protective element 303.

In addition, the physical contact between the movable contacting element 301 and the stationary contacting element 4 is established S5. The physical contact between the movable contacting element 301 and the stationary contacting element 4 may be established by a relatively small test current through said elements 301, 4. Alternatively or in addition, the charging station CS may be provided with means for a wireless communication with corresponding means of the vehicle, e.g. of the charging device 3. Thereby, signaling may be provided, e.g. from the charging device 3 to the charging station CS, with information that the movable contacting element 301 is in a physical contact with the stationary contacting element 4. In response to the establishment of the physical contact between the movable contacting element 301 and the stationary contacting element 4, the charging station CS provides S6 a current to the stationary contacting element 4 for electric charging of the electric storage arrangement 2.

Figure 6:
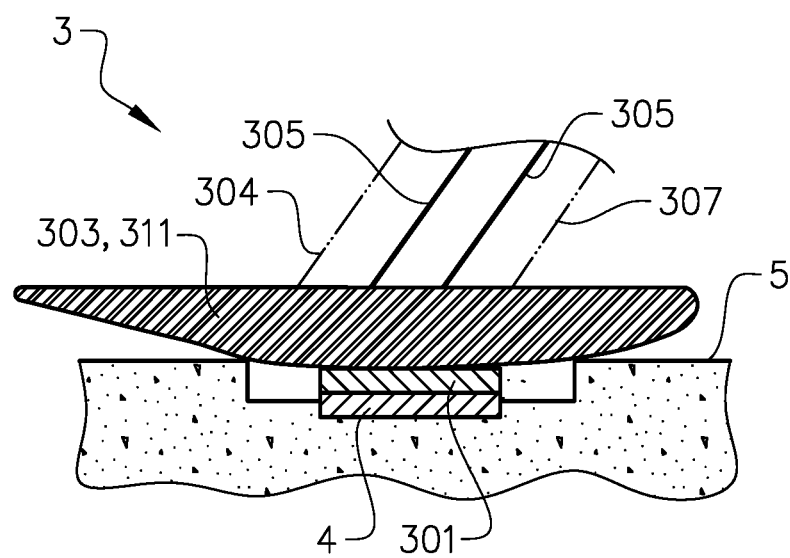
FIG. 6 is a view corresponding to the one in FIG. 2b with a pan of a charging device according to a further alternative embodiment of the invention.

FIG. 6 shows a further alterative embodiment. As in the embodiments above, the charging device 3 comprises a protective element 303 arranged to restrict access to the movable contacting element 301 and the stationary contacting element 4. As in the example in FIG. 3, the contacting surface of the stationary contacting element 4 is lower than the surrounding vehicle supporting element 5.

In the embodiment in FIG. 6, the protective element 303 is provided in the form of an aerodynamic device 311. Thus, the aerodynamic device 311 is integrated with the protective element 303.

Figure 7:
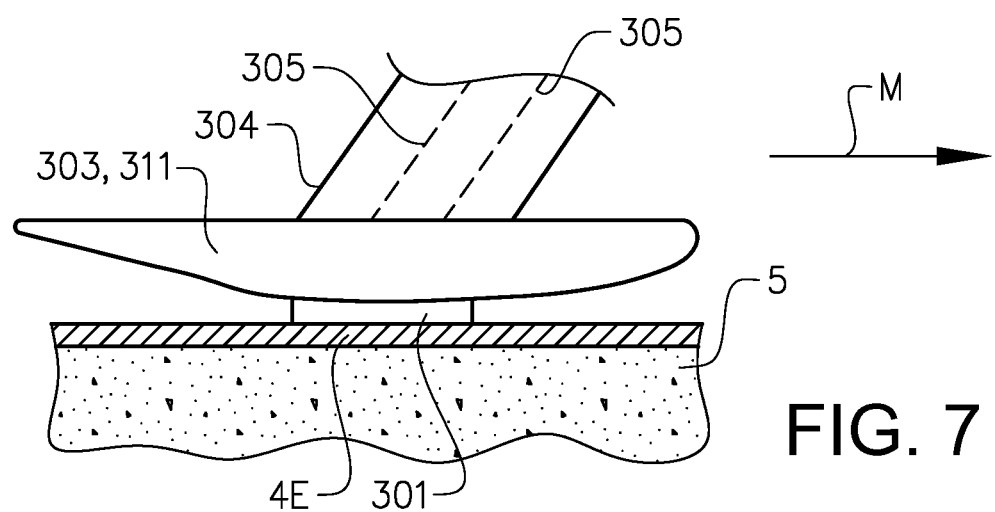
FIG. 7 is a cross-sectional view of the charging device part in FIG. 6, and a stationary contacting element arranged for a moving vehicle.

Reference is made to FIG. 7. In the embodiment in FIG. 6, as well as the embodiments in FIG. 2a-FIG. 4, the movable contacting element 301 extends, in the protruded position, to a lower position than the protective element 303.

This provides for the electric storage arrangement 2 of the vehicle 1 to be charged also when the vehicle is moving. Thus, embodiments of the invention will allow for a flexible charging process, involving either a stationary vehicle or a moving vehicle travelling on an electric road system.

For charging while the vehicle is moving, an, elongated stationary contacting element 4E is provided. The stationary contacting element 4E is in this example provided in the form of an electrically conductive rail. The rail 4E is submerged into the vehicle supporting element 5, and is exposed upwards. The rail 4E extends such that the vehicle 1 may be driven along the rail 4E and drag the contacting element 301 of the charging device 3 on the rail 4E.

It should be noted that various alternatives are possible for the stationary contacting element 4E for charging a moving vehicle, such as a monorail or a dual rail. The stationary contacting element 4E, in particular a contacting surface thereof, intended to be in contact with the movable contacting element 301, may be below, at level with, or elevated in relation to, the surface of the surrounding vehicle supporting element 5.

The stationary contacting element 4E may be part of a charging station. Such a station or system may be provided with means for establishing the speed of the vehicle, e.g. by wireless communication with the vehicle, or by suitable stationary sensors. Further, as a safety feature, the station or system may be arranged to allow a charging current to the stationary contacting element 4E on the condition that the vehicle is moving above a threshold speed. Thereby, the risk of persons or animals coming into contact with the stationary contacting element 4E while it is supplied with a charging current may be reduced. As a further safety feature, the station or system could comprise means to detect movement in the vicinity of e.g. in front of, the vehicle, and may allow a charging current the stationary contacting element 4E on the condition of absence of detected movements.

The combined protective element 303 and aerodynamic device 311 shown in FIG. 6 and FIG. 7 is arranged to provide, while the vehicle moves along the stationary contacting element 4E, a downwards directed force to the charging device contacting element 301. For this the aerodynamic device 311 is provided with the shape of an inverted airfoil, providing the downwards directed force to the charging arm 304 and the charging device contacting element 301, when the vehicle is moving in a direction indicated in FIG. 7 with the arrow M.

The aerodynamic device 311 will reduce, by means of the downwards directed force, the risk of the charging device contacting element 301 losing the electric contact with the rail 4E when the vehicle 1 moves along the stationary contacting element. The platform, i.e. the top-view of the aerodynamic device 311, may be of any suitable shape. It may be provided with a relatively large wing aspect ratio for a high aerodynamic efficiency, or it may present a relatively small aspect ratio, or even have a quadratic, circular or elliptic planform, for a low and practical space consumption.

Figure 8:
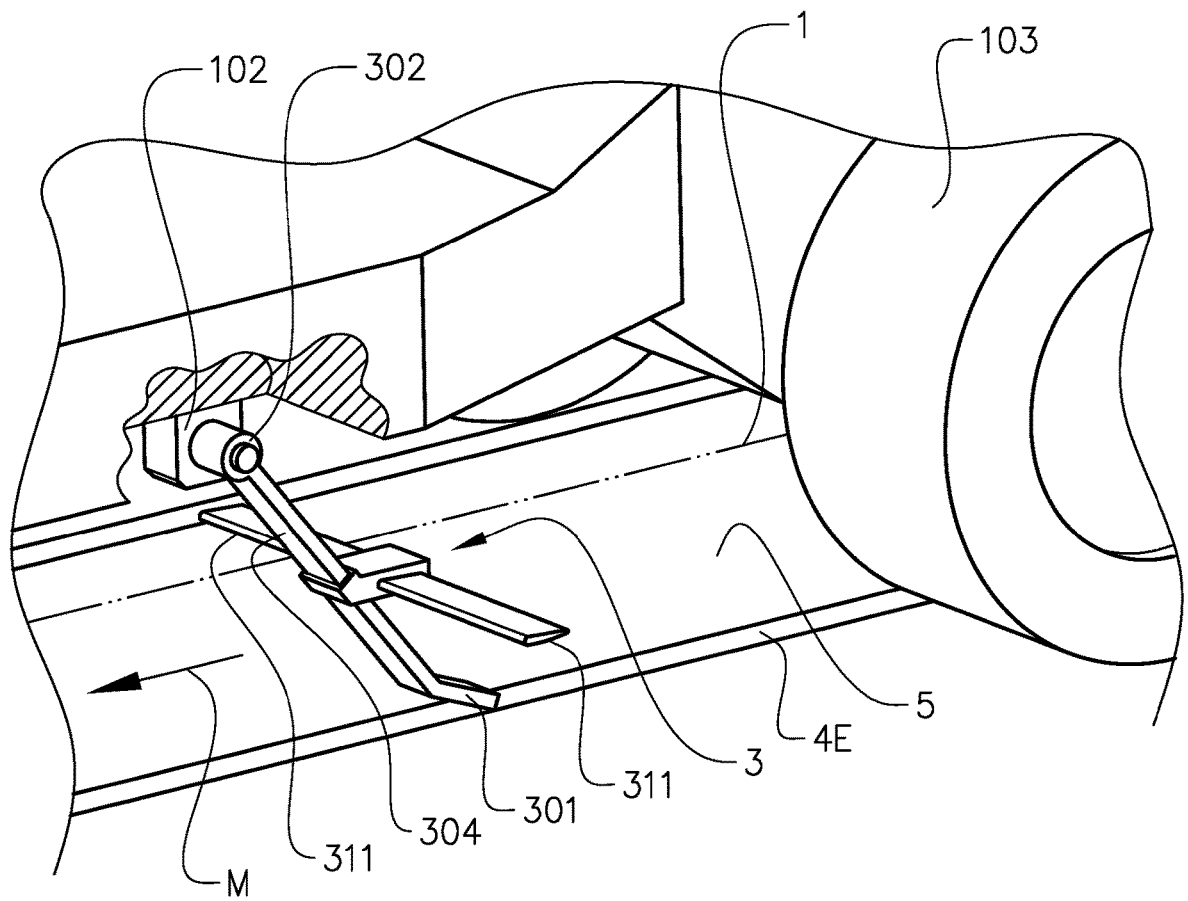
FIG. 8 is a perspective view of parts of a vehicle and a charging device according to an embodiment of a further aspect of the invention.

FIG. 8 shows an embodiment of a further aspect of the invention. A vehicle 1, in FIG. 8 mainly represented by a wheel 103 of the vehicle 1 and a broken line indicating an edge of the vehicle 1, is provided with an electric storage arrangement (not shown). The vehicle 1 is also provided with a movable changing device 3, arranged to be electrically connected to the electric storage arrangement.

The charging device 3 is mounted to a portion 102 of the vehicle 1, on downwards facing side of the vehicle 1. The charging device 3 comprises a contacting element 301 for electric contact with an elongated stationary contacting element 4E for electric charging of the electric storage arrangement 2. The stationary contacting element 4E is in this example provided, in the form of an electrically conductive rail. The rail 4E is submerged into a vehicle supporting element 5, such as a road, a street or a bridge. The rail is exposed upwards. The rail 4E extends such that the vehicle 1 may be driven along the rail 4E and drag the contacting element 301 of the charging device 3 on the rail 4E.

The charging device 3 comprises a charging arm 304 pivotably connected at one end to said portion 102 of the vehicle 1. The charging device contacting element 301 is mounted to the other end of the charging arm 304. The charging device further comprising an actuator 302 for moving, the charging device contacting element 301, by pivoting the charging arm 304, between a retracted position, and a protruded position shown in FIG. 8.

The charging device 3 further comprises an aerodynamic device 311 arranged to provide, while the vehicle moves along the stationary contacting element, a downwards directed force to the charging device contacting element 301. For this the aerodynamic device 311 is provided in the form of a spoiler, mounted on the charging arm 304. The spoiler 311 presents a wing-like shape with an inverted airfoil, providing the downwards directed force to the charging arm 304 and the charging device contacting element 301, when the vehicle is moving in a direction indicated in FIG. 8 with the arrow M.

The aerodynamic device 311 will reduce, by means of the downwards directed force, the risk of the charging device contacting element 301 losing the electric contact with the rail 4E when the vehicle 1 moves along the stationary contacting element.

It is to be understood that the present invention is not limited to the embodiments described above and illustrated in the drawings; rather, the skilled person will recognize that many changes and modifications may be made within the scope of the appended claims.

The invention claimed is:

1. A charging device for a vehicle comprising an electric storage arrangement, the charging device comprises:
   a charging arm arranged to be pivotably connected at one end to a portion of the vehicle, wherein the movable contacting element is mounted to the other end of the charging arm, the charging device being arranged to be mounted to the portion of the vehicle,
   a movable contacting element for electric contact with a stationary contacting element for electric charging of the electric storage arrangement while the vehicle moves along the stationary contacting element,
   an actuator for moving the movable contacting element between a retracted position and a protruded position, the charging device being arranged so that, while the vehicle is in a charging position in relation to the stationary contacting element, the stationary contacting element can be reached by the charging device, while the movable contacting element is in the protruded position, for the electric contact between the movable contacting element and the stationary contacting element,
   a protective element arranged to restrict access to the movable contacting element and the stationary contacting element when the movable contacting element and the stationary contacting element are in the electric contact with each other, and
   wherein the protective element comprises an electric ground shield (GS) arranged to be in contact with the vehicle supporting element when the movable contacting element and the stationary contacting element are in the electric contact with each other.

2. A charging device according to claim 1, wherein the protective element is arranged to extend in all horizontal directions outwardly from the movable contacting element, when the movable contacting element and the stationary contacting element are in the electric contact with each other.

3. A charging device according to claim 1, wherein the protective element is arranged to extend at least 100 mm in all horizontal directions outwardly from the movable contacting element, when the movable contacting element and the stationary contacting element are in the electric contact with each other.

4. A charging device according to claim 1, wherein the protective element is arranged to be, when the movable contacting element and the stationary contacting element are in the electric contact with each other, at a distance of less than 50 mm from a stationary surrounding element such as a vehicle supporting element.

5. A charging device according to claim 1 wherein the protective element is fixed to the movable contacting element.

6. A charging device according to claim 1, wherein the protective element is made in a non-conductive material.

7. A charging device according to claim 1, wherein the protective element comprises a supporting portion and a cover, the cover being in a non-conductive material and arranged to cover the supporting portion.

8. A charging device according to claim 1, wherein the charging device is arranged so as to provide the electric contact of the movable contacting element with the stationary contacting element where the stationary contacting element is located on or in a vehicle supporting element.

9. A charging device according to claim 1, wherein the charging device is arranged to be mounted on a downwards facing portion of the vehicle.

10. A charging device according to claim 1, wherein the protective element is arranged so that when the movable contacting element is in the electric contact with the stationary contacting element, the protective element is in contact with a stationary surrounding element surrounding the stationary contacting element.

11. A charging device according to claim 10, wherein a region of contact between the protective element and the stationary surrounding element surrounds the movable contacting element.

12. A charging device according to claim 1, wherein the charging device is arranged so that while the movable contacting element is in the protruded position, the movable contacting element extends to a lower position than the protective element.

13. A vehicle comprising a charging device according to claim 1.

14. A charging device according to claim 1, wherein the charging device further comprises an aerodynamic device arranged to provide, while the vehicle moves along an elongated stationary contacting element, a downwards directed force to the contacting element of the charging device.

15. A charging device according to claim 14, wherein the aerodynamic device is integrated with the protective element.

16. A combination of a charging station and a charging device for a vehicle comprising an electric storage arrangement, the charging station comprising a stationary contacting element which is provided in a stationary surrounding element comprising a vehicle supporting element, the charging device being arranged to be mounted to a portion of the vehicle, the charging device comprising a movable contacting element for electric contact with a contacting surface of the stationary contacting element for electric charging of the electric storage arrangement while the vehicle moves along the stationary contacting element, wherein the charging device comprises a protective element arranged to restrict access to the movable contacting element and the stationary contacting element when the movable contacting element and the stationary contacting element are in the electric contact with each other, and wherein the charging device is arranged so that the movable contacting element extends to a lower position than the protective element when the movable contacting element and the stationary contacting element are in the electric contact with each other, and that the contacting surface of the stationary contacting element is lower than a surface of the stationary surrounding element in a vicinity of the stationary contacting element, wherein the protective element comprises an electric ground shield (GS) arranged to be in contact with the vehicle supporting element when the movable contacting element and the stationary contacting element are in the electric contact with each other.

17. A method for charging an electric storage arrangement of a vehicle, comprising:

positioning the vehicle in a charging position in relation to a stationary contacting element, controlling an actuator for moving a movable contacting element of the vehicle from a retracted position to a protruded position to provide an electric contact between the movable contacting element and the stationary contacting element for electric charging of the electric storage arrangement while the vehicle moves along the stationary contacting element, providing a protective element to restrict access to the movable contacting element and the stationary contacting element when the movable contacting element and the stationary contacting are in the electric contact with each other, providing a contact between the protective element and a stationary surrounding element surrounding the stationary contacting element, when the movable contacting element is in the electric contact with the stationary contacting element, and providing the protective element with an electric ground shield (GS) arranged to be in contact with the vehicle supporting element when the movable contacting element and the stationary contacting element are in electric contact with each other.

18. A method according to claim 17, comprising arranging the protective element to extend in all horizontal directions outwardly from the movable contacting element, when the movable contacting element and the stationary contacting element are in the electric contact with each other.

19. A method according to claim 17, comprising providing an electrical ground connection to the protective element when the movable contacting element and the stationary contacting element are in the electric contact with each other.

20. A method according to claim 17, comprising providing an electric ground shield surrounding the movable contacting element when the movable contacting element and the stationary contacting element are in the electric contact with each other.

* * * * *